(12) United States Patent
Sakagami (10) Patent No.: US 12,449,580 B2
(45) Date of Patent: Oct. 21, 2025

(54) NEAR-INFRARED CUT FILTER AND IMAGING APPARATUS

(71) Applicant: AGC Inc., Tokyo (JP)

(72) Inventor: Takahiro Sakagami, Shizuoka (JP)

(73) Assignee: AGC Inc., Tokyo (JP)

( * ) Notice: Subject to any disclaimer, the term of this patent is extended or adjusted under 35 U.S.C. 154(b) by 659 days.

(21) Appl. No.: 17/805,319

(22) Filed: Jun. 3, 2022

(65) Prior Publication Data

US 2022/0299687 A1  Sep. 22, 2022

Related U.S. Application Data

(63) Continuation of application No. PCT/JP2020/042816, filed on Nov. 17, 2020.

(30) Foreign Application Priority Data

Dec. 23, 2019 (JP) ................ 2019-231753

(51) Int. Cl.
*G02B 5/28* (2006.01)
(52) U.S. Cl.
CPC ............. *G02B 5/281* (2013.01); *G02B 5/28* (2013.01); *G02B 5/282* (2013.01)
(58) Field of Classification Search
USPC ...................................................... 359/797
See application file for complete search history.

(56) References Cited

U.S. PATENT DOCUMENTS

| 2004/0165095 A1 | 8/2004 | Shimizu et al. |
| 2013/0094075 A1* | 4/2013 | Saitoh ............ G02B 5/208 |
| | | 359/350 |
| 2017/0017023 A1* | 1/2017 | Sugiyama ........... G02B 5/281 |
| 2018/0095203 A1 | 4/2018 | Ooi et al. |

FOREIGN PATENT DOCUMENTS

| JP | 2004-163869 A | 6/2004 |
| JP | 2017-222568 A | 12/2017 |
| JP | 2018-106171 A | 7/2018 |
| JP | 2018-159925 A | 10/2018 |
| WO | WO 2017/051867 A1 | 3/2017 |

OTHER PUBLICATIONS

International Search Report issued Dec. 15, 2020 in PCT/JP2020/042816, filed Nov. 17, 2020, 2 pages.

* cited by examiner

*Primary Examiner* — Dung T Nguyen
(74) *Attorney, Agent, or Firm* — Oblon, McClelland, Maier & Neustadt, L.L.P.

(57) ABSTRACT

A near-infrared cut filter includes a transparent substrate having a first and a second surfaces, opposite to each other; and a dielectric multilayer film disposed on a side of the first surface. The dielectric multilayer film reflects light within a wavelength range of 700-750 nm. A mean regular transmittance $T_1$ within a wavelength range of 700-750 nm measured when light is incident in the normal direction from the side of the second surface is 20% or less. A mean regular transmittance $T_2$ within a wavelength range of 600-680 nm measured when light is incident in the normal direction from the side of the second surface is 65% or more. A mean regular reflectance $R_1$ within a wavelength range of 700-750 nm measured when light is incident at an angle of 5° with respect to the normal direction from the side of the second surface is 80% or less.

20 Claims, 10 Drawing Sheets

NEAR-INFRARED CUT FILTER AND IMAGING APPARATUS

CROSS-REFERENCE TO RELATED APPLICATION

The present application is a continuation application of International Application No. PCT/JP2020/042816, filed Nov. 17, 2020, which claims priority to Japanese Patent Application No. 2019-231753 filed Dec. 23, 2019. The contents of these applications are incorporated herein by reference in their entirety.

BACKGROUND OF THE INVENTION

1. Field of the Invention

The present invention relates to a near-infrared cut filter and an imaging apparatus.

2. Description of the Related Art

An imaging apparatus, such as an on-board camera, is equipped with a solid-state imaging element (image sensor) for sensing surrounding landscape or the like. However, the solid-state imaging element is more sensitive to infrared light than the human vision. For this reason, a near-infrared cut filter is further installed in the imaging apparatus to bring the image produced by the solid-state imaging element closer to the human vision.

Generally, as the above-described near-infrared cut filters, near-infrared cut filters of reflection type and absorption type have been known.

Among them, the reflection type near-infrared cut filter is provided with a dielectric multilayer film (reflection film) on one surface of a transparent substrate. The dielectric multilayer film utilizes interference of light to reflect ultraviolet and infrared light incident on the near-infrared cut filter. Accordingly, by using such a near-infrared cut filter, an image (light) sensed by the solid-state imaging element can be made closer to the human vision (See, for example, Japanese Unexamined Patent Application Publication No. 2004-163869).

On the other hand, the absorption type near-infrared cut filter includes a transparent substrate having a function of absorbing near-infrared light. Near-infrared light incident on the filter is absorbed by the transparent substrate. Accordingly, also in this case, an image (light) sensed by the solid-state imaging element can be made closer to the human vision (See, for example, Japanese Unexamined Patent Application Publication No. 2018-106171).

SUMMARY OF INVENTION

Problem to be Solved by the Invention

In the imaging apparatus to which the reflection type near-infrared cut filter is applied, light transmitted through the filter and incident on the solid-state imaging element may be reflected by the solid-state imaging element, then reflected back by the filter and re-incident on the solid-state imaging element.

Such a phenomenon can lead to an occurrence of ghosting and flaring. Particularly, in a dark environment, i.e., an environment with a small amount of light, ghosting and flaring may be more likely to occur even if only a small amount of stray light is generated.

In particular, in recent years, a sensing function of an imaging apparatus has been improved, and this problem may become more evident in the future.

On the other hand, in the imaging apparatus using the near-infrared cut filter of the absorption type, an amount of visible light reaching the solid-state imaging element, particularly an amount of red light, may be insufficient. This is because an absorber contained in the transparent substrate absorbs even red light in addition to near-infrared light from the light incident on the filter.

For example, in the case where the imaging apparatus is an in-vehicle camera, such behavior can lead to a reduction of the function of sensing road signs, traffic signals, and red light emitted from a tail lamp of a vehicle.

Thus, considering the application to a high precision imaging apparatus, conventional near-infrared cut filters, both of the reflection type and the absorbing type, still can be improved in terms of performance.

The present invention has been made in view of such background, and it is an object of the present invention to provide a near-infrared cut filter which, when applied to an imaging apparatus, can significantly reduce an occurrence of ghosting and flaring while significantly suppressing a decrease in an amount of visible light, particularly red light. It is also an object of the present invention to provide an imaging apparatus with such a near-infrared cut filter.

Means for Solving Problems

According to an aspect of the present disclosure, a near-infrared cut filter including
  a transparent substrate having a first surface and a second surface, opposite to each other; and
  a dielectric multilayer film disposed on a side of the first surface of the transparent substrate,
  the dielectric multilayer film reflecting light within a wavelength range from 700 nm to 750 nm inclusive,
  a mean transmittance $T_1$ of the near-infrared cut filter being 20% or less, a mean reflectance $R_1$ of the near-infrared cut filter being 80% or less, and
  a mean transmittance $T_2$ of the near-infrared cut filter being 65% or more,
  the mean transmittances $T_1$ and $T_2$ representing mean regular transmittances within a wavelength range from 700 nm to 750 nm inclusive and within a wavelength range from 600 nm to 680 nm inclusive, respectively, measured when light is incident in a normal direction from a side of the second surface of the transparent substrate in the near-infrared cut filter, and
  the mean reflectance $R_1$ representing a mean regular reflectance within a wavelength range from 700 nm to 750 nm inclusive measured when light is incident at an angle of 5° with respect to the normal direction from the side of the second surface of the transparent substrate in the near-infrared cut filter, is provided.

According to another aspect of the present disclosure, an imaging apparatus including
  a near-infrared cut filter; and
  a solid-state imaging element that generates an electric signal from light incident through the near-infrared cut filter, the near-infrared cut filter being the near-infrared cut filter having the above-described features, and being arranged such that the side of the second surface faces the solid-state imaging element, is provided.

Effects of the Invention

According to the present invention, a near-infrared cut filter that, when applied to an imaging apparatus, can significantly reduce an occurrence of ghosting and flaring while significantly suppressing a decrease in an amount of visible light, particularly a decrease in an amount of red light, can be provided. The present invention also provides an imaging apparatus with such a near-infrared cut filter.

BRIEF DESCRIPTION OF DRAWINGS

Other objects and further features of the present disclosure will be apparent from the following detailed description when read in conjunction with the accompanying drawings, in which.

DESCRIPTION OF THE PREFERRED EMBODIMENT

Hereinafter, the embodiment of the present invention will be described.
(Conventional Near-Infrared Cut Filter)

First, a configuration of a conventional near-infrared cut filter and its problem will be briefly described.

As described above, near-infrared cut filters of reflection and absorption types are conventionally known as near-infrared cut filters applied to imaging apparatuses.

A reflection type near-infrared cut filter (hereinafter referred to as "reflection type filter") has a dielectric multilayer film (reflection film) on one surface of a transparent substrate that reflects ultraviolet and infrared (including near-infrared) light.

Figure 1:
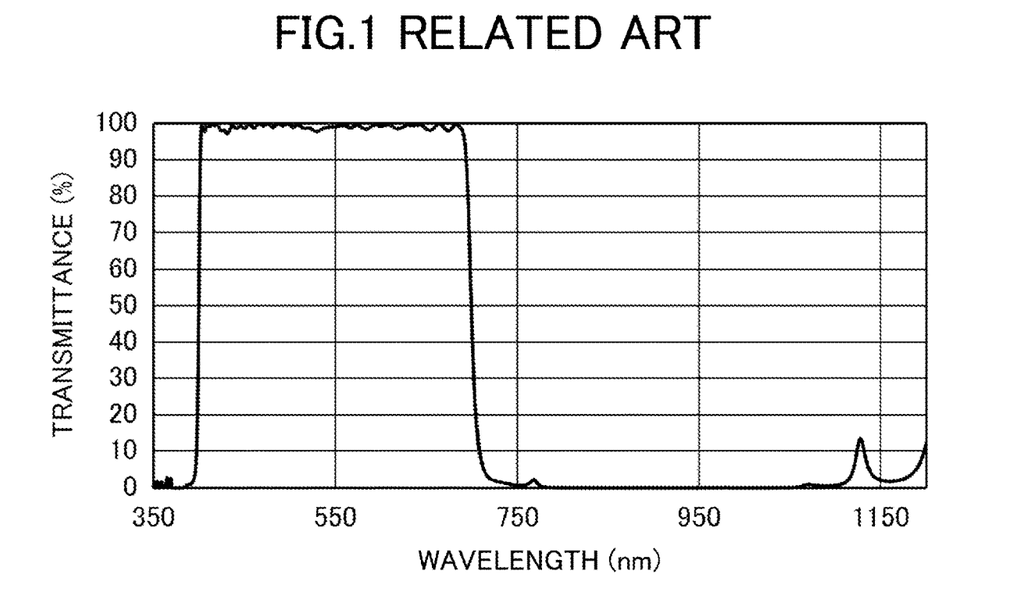
FIG. 1 is a diagram depicting an example of transmission characteristics in a conventional reflection type near-infrared cut filter, in particular, showing a wavelength-dependence of a transmittance in a near-infrared cut filter according to a comparative example (Example 11)
Figure 2:
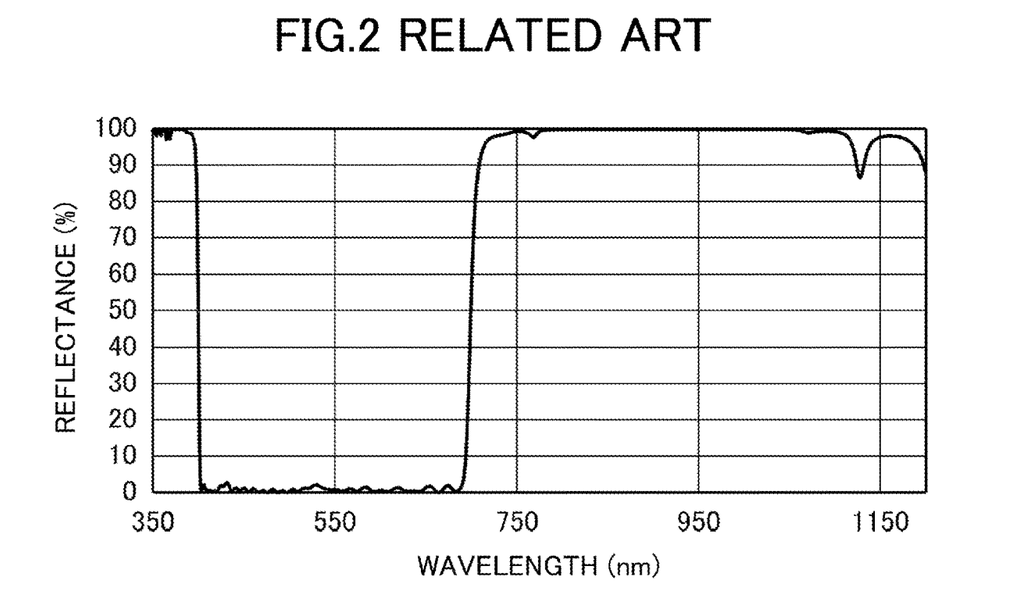
FIG. 2 is a diagram depicting an example of reflection characteristics in the conventional reflection type near-infrared cut filter, in particular, showing a wavelength-dependence of a reflectance in the near-infrared cut filter according to the comparative example (Example 11)

FIGS. 1 and 2 are diagrams depicting an example of optical characteristics in the reflection type filter.

FIG. 1 shows transmission characteristics of the reflection type filter, and FIG. 2 shows reflection characteristics of the reflection type filter. These figures show a behavior obtained when light is incident on the side opposite to the reflection film, that is, on the side where the solid-state imaging element is installed.

From FIG. 2, the reflection type filter is found to produce a large reflection within a wavelength range from 700 nm to 750 nm inclusive.

When the reflection type filter having the above-described reflection behavior is applied to an imaging apparatus, light that has arrived at the solid-state imaging element through the reflection type filter from outside is reflected by the solid-state imaging element back to the reflection type filter and then reflected back toward the solid-state imaging element by the reflection type filter again. Therefore, light is incident on the solid-state imaging element a plurality of times. Such multiple incidence of light can generate ghosting and flaring when an image is captured by the imaging apparatus.

On the other hand, in a near-infrared cut filter of the absorption type (hereinafter referred to as an "absorption type filter"), a substrate that absorbs near-infrared light is used as a transparent substrate. In addition, a dielectric multilayer film (reflection film) may also be installed in the near-infrared cut filter of the absorption type.

Figure 3:
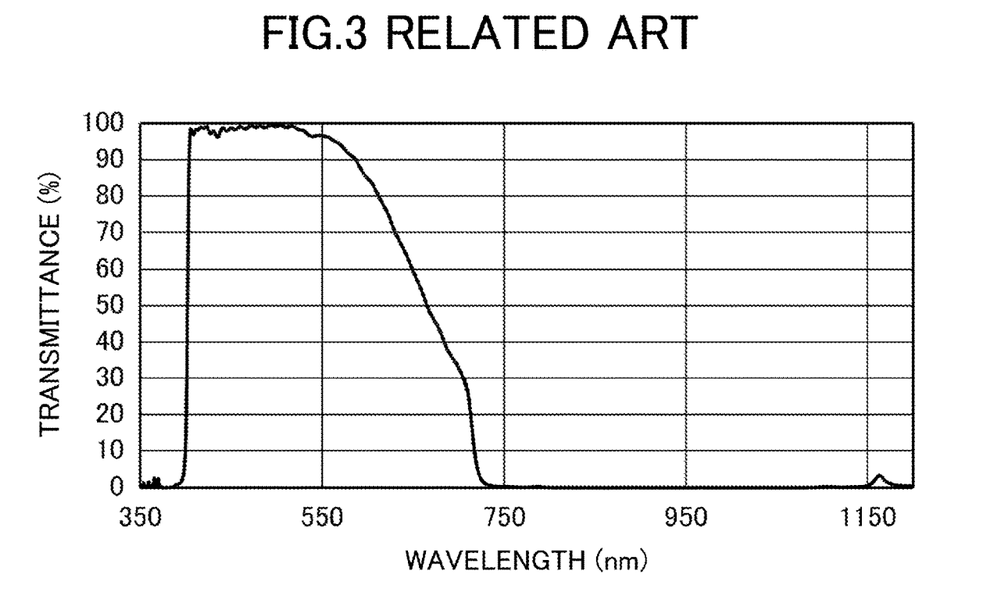
FIG. 3 is a diagram depicting an example of transmission characteristics in a conventional absorption type near-infrared cut filter, in particular, showing a wavelength-dependence of a transmittance in a near-infrared cut filter of a comparative example (Example 12)
Figure 4:
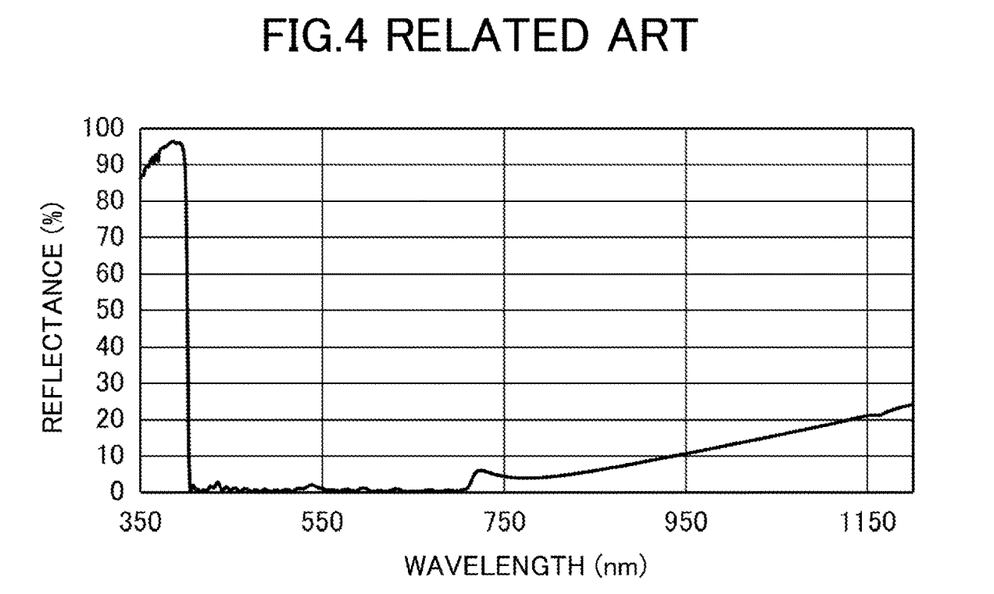
FIG. 4 is a diagram depicting an example of reflection characteristics in the conventional absorption type near-infrared cut filter, in particular, showing a wavelength-dependence of a reflectance in the near-infrared cut filter according to the comparative example (Example 12)

FIGS. 3 and 4 are diagrams depicting an example of optical characteristics in the absorption type filter.

FIG. 3 shows transmission characteristics of the absorption type filter, and FIG. 4 shows reflection characteristics of the absorption type filter. These figures show a behavior obtained when light is incident on the side opposite to the reflection film, that is, on the side where the solid-state imaging element is installed.

From FIG. 3, the transmittance of the absorption type filter is found to be greatly reduced within a wavelength range from 650 nm to 700 nm inclusive. In the absorption type filter, the total amount of transmission of visible light tends to decrease because the transmission starts to decrease from a wavelength of 550 nm.

When the absorption type filter having the above-described transmission behavior is applied to an imaging apparatus, there is a problem that the amount of red light reaching the solid-state imaging element decreases and the total amount of visible light decreases.

Thus, with the conventional near-infrared cut filters, problems may arise with both reflective and absorption type filters when the application to the imaging apparatus is considered.

On the other hand, according to an aspect of the embodiment of the present invention, a near-infrared cut filter including a transparent substrate having first surface and a second surface, opposite to each other; and a dielectric multilayer film disposed on a side of the first surface of the transparent substrate, the dielectric multilayer film reflecting light within a wavelength range from 700 nm to 750 nm inclusive, a mean transmittance $T_1$ being 20% or less, a mean reflectance $R_1$ being 80% or less, and a mean transmittance $T_2$ being 65% or more, the mean transmittances $T_1$ and $T_2$ representing mean regular transmittances within a wavelength range from 700 nm to 750 nm inclusive and within a wavelength range from 600 nm to 680 nm inclusive, respectively, measured when light is incident in a normal direction from a side of the second surface of the transparent substrate in the near-infrared cut filter, and the mean reflectance $R_1$ representing a mean regular reflectance within a wavelength range from 700 nm to 750 nm inclusive measured when light is incident at an angle of 5° with respect to the normal direction from the side of the second surface of the transparent substrate in the near-infrared cut filter, is provided.

In the near-infrared cut filter according to the embodiment of the present invention, the mean transmittance $T_1$ measured as described above is 20% or less.

Accordingly, the near-infrared cut filters according to the embodiment of the present invention can properly block near-infrared light and are suitably applicable to an imaging apparatus having a solid-state imaging element such as an image sensor.

In the near-infrared cut filter according to the embodiment of the present invention, the mean transmittance $T_1$ is preferably 17% or less, more preferably 14% or less, and even more preferably 11% or less. The lower limit of the mean transmittance $T_1$ is preferably greater than or equal to $1\times10^{-7}$%, more preferably greater than or equal to $1\times10^{-6}$%, and even more preferably greater than or equal to $1\times10^{-5}$% from the viewpoint of the deposition cost. However, the mean transmittance $T_1$ may be 0%.

In addition, in the near-infrared cut filter according to the embodiment of the present invention, the mean reflectance $R_1$ measured as described above is 80% or less.

When such a near-infrared cut filter is applied to the imaging apparatus, it is possible to significantly suppress the reflected light from being reflected back by the near-infrared cut filter, even if the light that reaches the solid-state imaging element from the outside through the near-infrared cut filter is reflected by the solid-state imaging element.

Accordingly, the near-infrared cut filter according to the embodiment of the present invention can significantly reduce the occurrence of ghosting and flaring when applied to the imaging apparatus.

In the near-infrared cut filter according to the embodiment of the present invention, the mean reflectance $R_1$ is preferably 70% or less, more preferably 60% or less, and even more preferably 50% or less.

Furthermore, in the near-infrared cut filter according to the embodiment of the present invention, the mean transmittance $T_2$ measured as described above is 65% or more.

When the above-described near-infrared cut filter is applied to the imaging apparatus, the problem of reduction of the amount of red light reaching the solid-state imaging element and the whole amount of visible light is significantly suppressed.

In the near-infrared cut filter according to the embodiment of the invention, the mean transmittance $T_2$ preferably falls within a range from 70% to 100%, more preferably falls within a range from 75% to 100%, and even more preferably falls within a range from 80% to 100%.

As a result, according to the embodiment of the present invention, it is possible to provide a near-infrared cut filter that can significantly reduce ghosting and flaring while significantly suppressing the reduction of the amount of visible light, particularly the reduction of red light.

The near-infrared cut filter according to the embodiment of the present invention can be suitably used as a filter for a variety of imaging apparatuses provided with solid-state imaging elements, such as digital cameras, video cameras, and camera-equipped mobile phones, as well as on-board cameras.

(Near-Infrared Cut Filter According to the Embodiment of the Invention)

Next, the near-infrared cut filter according to the embodiment of the present invention will be described in more detail with reference to FIG. 5.

Figure 5:
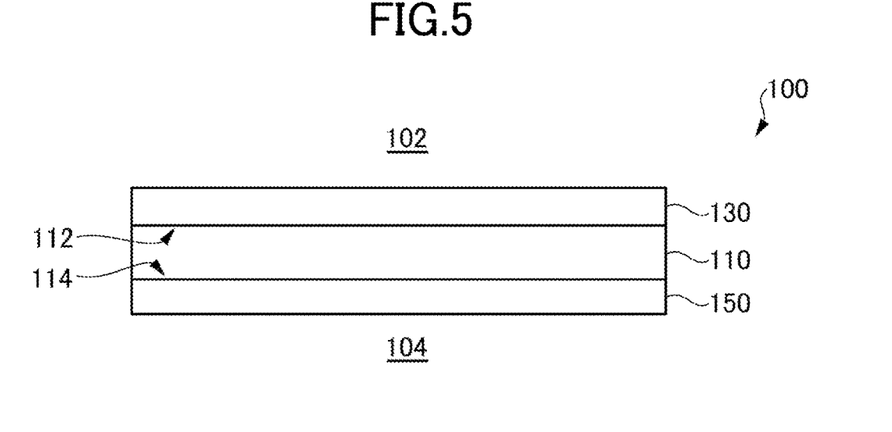
FIG. 5 is a cross-sectional view schematically illustrating an example of a configuration of a near-infrared cut filter according to the embodiment of the present invention.

FIG. 5 schematically shows a cross-section of the near-infrared cut filter (hereinafter referred to as "first optical filter") according to the embodiment of the present invention.

As shown in FIG. 5, the first optical filter 100 includes a transparent substrate 110, a first dielectric multilayer film 130, and a second dielectric multilayer film 150.

The transparent substrate 110 has first and second surfaces 112 and 114 that are opposite to each other. The first dielectric multilayer film 130 is disposed on a side of the first surface 112 of the transparent substrate 110. The second dielectric multilayer film 150 is disposed on a side of the second surface 114 of the transparent substrate 110.

The first optical filter 100 has a first side 102 and a second side 104. The first side 102 corresponds to the side on which the first dielectric multilayer film 130 is disposed, i.e., the side of the first surface 112 of the transparent substrate 110, and the second side 104 corresponds to the side on which the second dielectric multilayer film 150 is disposed, i.e., the side of the second surface 114 of the transparent substrate 110.

The first dielectric multilayer film 130 has a function of reflecting ultraviolet and infrared light incident from the first side 102 of the first optical filter 100. In particular, the first dielectric multilayer film 130 has a property of reflecting light within a wavelength range from 700 nm to 750 nm inclusive.

Although the structure of the first dielectric multilayer film 130 will be described later, the first dielectric multilayer film 130 may be a reflection film used in the conventional near-infrared cut filter.

On the other hand, the second dielectric multilayer film 150 functions as an antireflection film that suppresses reflection of light incident from the first side 102 of the first optical filter 100. Although the structure of the second dielectric multilayer 150 will be described later, the second dielectric multilayer 150 may be an antireflection film used in a conventional near-infrared cut filter.

The second dielectric multilayer film 150 may be omitted.

The transparent substrate 110 has a function of absorbing near-infrared light.

For example, the mean transmittance of the transparent substrate 110 within a wavelength range from 600 nm to 680 nm inclusive may be 70% or more, and the mean transmittance of the transparent substrate 110 within a wavelength range from 700 nm to 750 nm inclusive may be 90% or less.

The first optical filter 100 has a feature that the mean transmittance $T_1$ is 20% or less, the mean reflectance $R_1$ is 80% or less, and the mean transmittance $T_2$ is 65% or more, which are measured as described above.

Accordingly, when the above-described first optical filter 100 is applied as a near-infrared cut filter in the imaging apparatus, ghosting and flaring can be significantly reduced while significantly suppressing a decrease in the amount of light reaching the solid-state imaging element, particularly the amount of red light.

(Components of Near-Infrared Cut Filter According to the Embodiment of the Present Invention)

Next, components included in the near-infrared cut filter according to the embodiment of the present invention will be described in more detail.

For the sake of clarity, the components will be described with reference to the first optical filter 100, as the near-infrared cut filter according to the embodiment of the present invention. Accordingly, the reference numeral shown in FIG. 5 will be used when referring to each component.

(Transparent Substrate 110)

The transparent substrate 110 preferably has the following properties:

the mean transmittance within a wavelength range from 600 nm to 680 nm inclusive is 70% or more; and the mean transmittance within a wavelength range from 700 nm to 750 nm inclusive is 90% or less.

More preferably, the mean transmittance of the transparent substrate 110 within a wavelength range from 600 nm to 680 nm inclusive is 75% or greater, and even more preferably 80% or greater.

In addition, the mean transmittance of the transparent substrate 110 within a wavelength range from 700 nm to 750 nm inclusive is more preferably 85% or less, and further preferably 80% or less.

The mean transmittance of the transparent substrate 110 may be 80% or greater within a wavelength range from 400 nm to 600 nm inclusive.

The transparent substrate 110 may be formed of glass.

For example, the transparent substrate 110 may be formed of glass containing $P_2O_5$, $Al_2O_3$, R'O, where R'O represents one or more selected from MgO, CaO, SrO, BaO, and ZnO, and $Fe_2O_3$, in terms of oxide.

Among the above-described oxides, $P_2O_5$ is a main component forming glass (glass-forming oxide), and the absorption effect of the near-infrared region can be enhanced by adding $P_2O_5$.

$Al_2O_3$ is a main component of forming glass (glass-forming oxide), and the weather resistance of glass can be enhanced by the adding $Al_2O_3$.

R'O (where R'O represents one or more of MgO, CaO, SrO, BaO, and ZnO) has an effect of lowering the melting temperature of the glass, lowering the liquid phase temperature of the glass, stabilizing the glass, and increasing the strength of the glass.

$Fe_2O_3$ is added for absorbing near-infrared light. The content of $Fe_2O_3$ is preferably greater than or equal to 0.1% and less than or equal to 35%. In the case where the $Fe_2O_3$ content is less than 0.1%, the near-infrared absorption effect is not sufficiently obtained when the glass thickness is reduced. On the contrary, if the $Fe_2O_3$ content exceeds 35%, the transmittance of visible light is reduced and this is not desirable.

The content of $Fe_2O_3$ is preferably from 2.0% to 35%, more preferably from 4.0% to 35%, and even more preferably from 5.0% to 35%.

In the present application, the content of $Fe_2O_3$ is a value obtained by converting the total amount of all Fe (iron) components to $Fe_2O_3$.

It is also preferable that the glass be substantially free from fluorine. Fluorine is an effective component for increasing the weather resistance of glass, but it is a substance of environmental concern.

In the present application, "substantially free from (element)" means that such an element is not intentionally added to the raw material. Accordingly, such an element may exist in glass as an inevitable impurity in the raw material and/or as an inevitable impurity entering during the manufacturing process.

For example, the transparent substrate 110 may include $P_2O_5$ of from 25% to 75%, $Al_2O_3$ of from 2.5% to 22%, $\Sigma R_2O$ (where $\Sigma R_2O$ represents a sum of $Li_2O$, $Na_2O$, and $K_2O$) of from 0% to 35%, $\Sigma R'O$ (where $\Sigma R'O$ represents a sum of MgO, CaO, SrO, BaO, and ZnO) of from 0.1% to 35%, and $Fe_2O_3$ of from 0.1% to 35% by mol % in terms of oxide.

Alternatively, the transparent substrate 110 may be a resin sheet containing components (absorbing components) that absorb near-infrared light.

The transparent substrate 110 may also be a composite substrate including a glass substrate and a resin film disposed on the glass substrate.

In this case, by using a resin containing an absorption component that absorbs near-infrared light as the resin film, a glass substrate that does not contain the absorption component can be used.

The absorption components contained in the resin film may be an organic pigment such as squarylium and/or an inorganic pigment such as copper complex.

The thickness of the transparent substrate 110 is preferably within a range, for example, from 0.05 mm to 5 mm inclusive, from 0.1 mm to 3 mm inclusive, and more preferably within a range from 0.2 mm to 1 mm inclusive.

(First Dielectric Multilayer Film 130)

The first dielectric multilayer film 130 has a function of reflecting ultraviolet and infrared light. In particular, the first dielectric multilayer film 130 has a function of reflecting light within a wavelength range from 700 nm to 750 nm inclusive.

For example, the first dielectric multilayer film 130 may have a repeating structure of a "high refractive index layer" and a "low refractive index layer". The "high refractive index layer" means a layer having a refractive index of 2.0 or more at a wavelength of 500 nm, and the "low refractive index layer" means a layer having a refractive index of 1.6 or less at a wavelength of 500 nm.

Materials of the high refractive index layer include, for example, titanium oxide, tantalum oxide, and niobium oxide. Examples of materials of the low refractive index layer include silicon oxide and magnesium fluoride. For example, the refractive index of titanium oxide at a wavelength of 500 nm, depending on the crystalline state, generally ranges from 2.3 to 2.8, and the refractive index of silicon oxide generally ranges from 1.4 to 1.5.

The number of repetitions (=number of layers/2) of the high refractive index layer and the low refractive index layer is not particularly limited, but ranges from, for example, 2 to 50. The number of repetitions is preferably within a range from 6 to 25.

Also, a total thickness (physical thickness) of the first dielectric multilayer film 130 is, for example, within a range from 200 nm to 10 μm inclusive, and preferably within a range from 1 μm to 6 μm inclusive.

(Second Dielectric Multilayer Film 150)

The second dielectric multilayer film 150 functions as an antireflection film and serves to increase the transmittance of visible light. The second dielectric multilayer film 150 may have a function reflecting ultraviolet and infrared light.

For example, the second dielectric multilayer film 150 may have the above-described repeating structure of a high refractive index layer and a low refractive index layer.

The number of repetitions (=number of layers/2) of the high refractive index layer and the low refractive index layer is not particularly limited, but ranges from, for example, 2 to 25. The number of repetitions is preferably within a range from 2 to 20.

Also, a total thickness (physical thickness) of the second dielectric multilayer film 150 is, for example, within a range from 200 nm to 5 μm inclusive, and preferably within a range from 200 nm to 4 μm inclusive.

(First Optical Filter 100)

The first optical filter 100, as described above, satisfies that the mean transmittance $T_1 \leq 20\%$, the mean reflectance $R_1 \leq 80\%$, and the mean transmittance $T_2 \geq 65\%$.

Furthermore, a mean transmittance within a wavelength range from 1000 nm to 1200 nm inclusive (hereinafter referred to as "$T_3$") of the first optical filter 100 is preferably 5% or less. In this case, the amount of light in the near-infrared region transmitted through the first optical filter 100 can be further reduced.

The mean transmittance $T_3$ is preferably 4% or less, more preferably 3% or less, and even more preferably 2% or less. The lower limit of the mean transmittance $T_3$ is preferably $1 \times 10^{-7}\%$ or more, more preferably $1 \times 10^{-6}\%$ or more, and even more preferably $1 \times 10^{-5}\%$ or more from the viewpoint of deposition cost. However, the mean transmittance $T_3$ may be 0%.

A mean reflectance of the first optical filter 100 of light incident from the side of the second surface of the transparent substrate within a wavelength range from 900 nm to 1200 nm inclusive (hereinafter, referred to as "$R_2$") is preferably 30% or less. In this case, the problem that the light reflected by the solid-state imaging element side is reflected by the first optical filter 100 again and enters the solid-state imaging element can be further suppressed.

The mean reflectance $R_2$ is preferably 27% or less, more preferably 24% or less, and even more preferably 20% or less.

A transmittance of the first optical filter 100 of light incident from the side of the second surface of the transparent substrate at a wavelength of 750 nm (hereinafter, referred to as "$T_4$") is preferably 10% or less. In this case, the amount of light in the near-infrared region emitted from the first optical filter 100 can be further reduced.

The transmittance $T_4$ is preferably 8% or less, more preferably 6% or less, and even more preferably 5% or less.

The lower limit of transmittance $T_4$ is preferably $1 \times 10^{-7}\%$ or more, more preferably $1 \times 10^{-6}\%$ or more, and even more preferably $1 \times 10^{-5}\%$ or more from the viewpoint of the deposition cost. However, the transmittance $T_4$ may be 0%.

In the present application, both the mean transmittance $T_3$ and the transmittance $T_4$ of the first optical filter 100 represent the values measured by the same measurement method as the mean transmittances $T_1$ and $T_2$ described above. The mean reflectance $R_2$ of the first optical filter 100 represents a value that is measured by the same measurement method as the mean reflectance $R_1$ described above.

(Application Example of the Near-Infrared Cut Filter According to the Embodiment of the Invention)

Next, an application example of the near-infrared cut filter according to the embodiment of the present invention will be described. Here, the application example will be described with reference to the above-described first optical filter 100.

Figure 6:
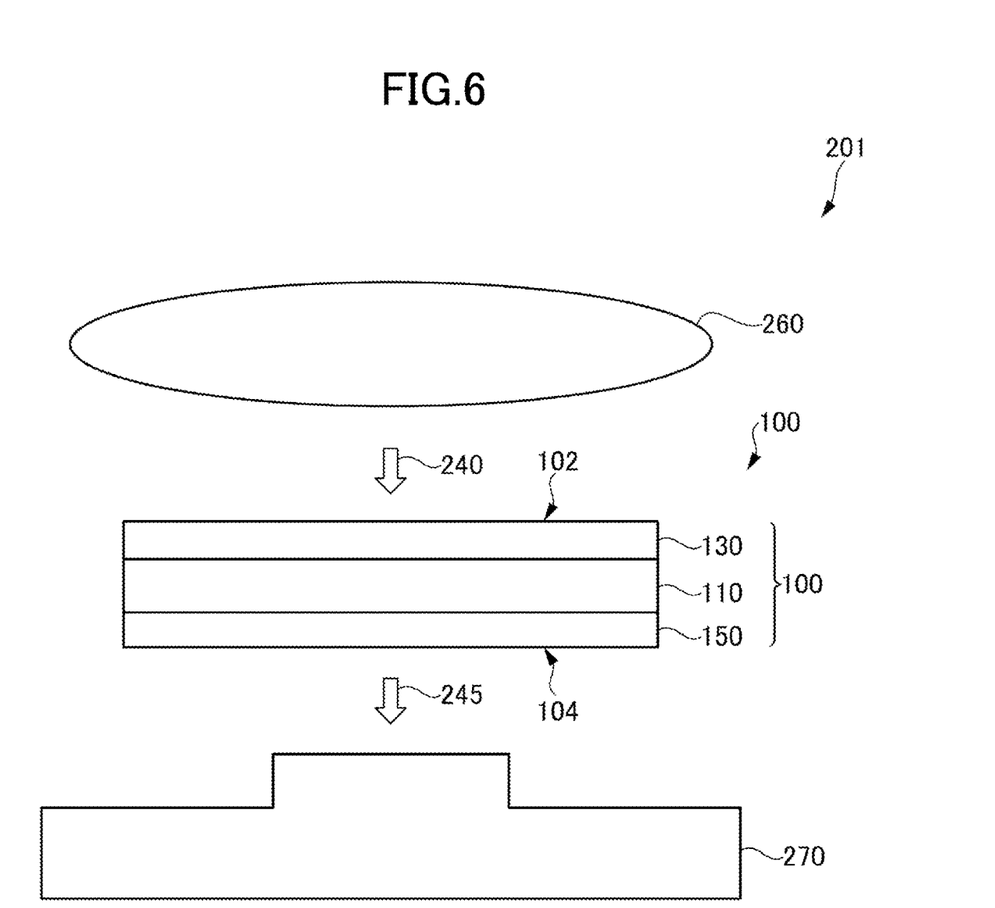
FIG. 6 is a cross-sectional view schematically illustrating an example of an imaging apparatus provided with the near-infrared cut filter according to the embodiment of the present invention.

FIG. 6 schematically shows a configuration of an imaging apparatus provided with the near-infrared cut filter according to the embodiment of the invention.

As shown in FIG. 6, the imaging apparatus 201 includes a lens 260, a first optical filter 100 as a near-infrared cut filter, and a solid-state imaging element 270.

The lens 260 has a function of focusing external light onto the first optical filter 100.

The solid-state imaging element 270 may be, for example, a charge coupled device (CCD) image sensor or a complementary metal oxide semiconductor (CMOS) image sensor.

The lens 260 is disposed on the first side 102 of the first optical filter 100. In contrast to this, the solid-state imaging element 270 is disposed on the second side 104 of the first optical filter 100.

When the image is captured by the imaging apparatus 201, first, light 240 collected by the lens 260 (incident light) is transmitted into the first optical filter 100.

The first optical filter 100 has a first dielectric multilayer film 130 on the first side 102. Therefore, most of ultraviolet and infrared light contained in the incident light is reflected without passing through the first optical filter 100.

Meanwhile, incident light 240 that is not reflected by the first dielectric multilayer film 130 enters the interior of the first optical filter 100. Then, the incident light 240 becomes light 245 that passes through the transparent substrate 110 and the second dielectric multilayer film 150, to reach the solid-state imaging element 270.

The solid-state imaging element 270 performs a photoelectric conversion for the light 245, to generate a photoelectric signal. Accordingly, in the imaging apparatus 201, the electric signal can be used to image a surrounding landscape or the like.

Here, in the imaging apparatus 201, the first optical filter 100 has the feature that the mean transmittance $T_1$ is 20% or less and the mean transmittance $T_2$ is 65% or more. Thus, the first optical filter 100 can absorb light within a wavelength range from 700 nm to 750 nm inclusive without absorbing much light with the wavelength within the range from 600 nm to 680 nm inclusive.

To achieve the above-described function, for example, the transparent substrate 110 of the first optical filter 100 may have a feature that the mean transmittance within a wavelength range from 600 nm to 680 nm inclusive is 70% or more, and the mean transmittance within a wavelength range from 700 nm to 750 nm inclusive is 90% or less.

According to the above-described effect, the light 245 emitted from the first optical filter 100 has a significantly greater amount of light than that of the conventional absorption type near-infrared cut filter. The decrease in the amount of light is significantly suppressed, particularly within a wavelength range from 600 nm to 680 nm inclusive. Accordingly, in the imaging apparatus 201, in the light 245 incident on the solid-state imaging element 270, the problem in the related art that the amount of visible light decreases, particularly red light, can be significantly suppressed.

A portion of the light 245 that reaches the solid-state imaging element 270 is reflected toward the first optical filter 100. Accordingly, ghosting and flaring may occur when the reflected light is again incident on the solid-state imaging element 270.

However, in the first optical filter 100, the mean reflectance $R_1$ described above is suppressed to 80% or less. Therefore, further reflection of the reflected light reaching the first optical filter 100 back toward the solid-state imaging element 270 is significantly suppressed.

As a result, in the imaging apparatus 201, the occurrence of ghosting and flaring can be significantly reduced while significantly suppressing the decrease in the amount of light reaching the solid-state imaging element 270, particularly the amount of red light. Thus, the accuracy of the sensing in the imaging apparatus 201 can be increased.

The above-described imaging apparatus 201 may be applied, for example, to in-vehicle cameras, digital cameras, video cameras, camera-equipped mobile phones, and the like.

As described above, the near-infrared cut filter according to the embodiment of the present invention has been described with reference to the first optical filter 100 or the like.

However, it is apparent to those skilled in the art that the above description is merely an example and that the near-infrared cut filter of the present invention may have other configurations.

For example, in the first optical filter 100, the first dielectric multilayer film 130 is disposed only on the side of the first surface 112 of the transparent substrate 110.

Alternatively, however, the first dielectric multilayer film 130, as a reflection film, may be disposed on each of both sides of the transparent substrate 110.

In addition, various other modifications are possible.

EXAMPLE

Hereinafter, examples of the present invention will be described. In the following description, Examples 1 to 4 are practical examples, and Examples 11 to 14 are comparative examples.

Optical characteristics were evaluated for each of the near-infrared cut filters having configurations shown in following examples. The optical characteristics were evaluated using a commercially available optical simulation software (TFCalc by Software Spectra, Inc.)

As described above, in the evaluation below, each transmittance in the near-infrared cut filter represents the regular transmittance obtained when light is incident in the normal direction from a side of the second surface of the glass substrate. Each reflectance in the near-infrared cut filter represents the regular reflectance obtained when light is incident at an angle of 5° with respect to the normal direction from the side of the second surface of the glass substrate in the near-infrared cut filter.

Example 1

In Example 1, the near-infrared cut filter had a configuration in which a first dielectric multilayer film (a reflection film) was disposed on the first surface of the glass substrate and a second dielectric multilayer film (an antireflection film) was disposed on the second surface of the glass substrate.

Glass with the following composition by mol % in terms of oxide (hereinafter referred to as "glass A") was used for the glass substrate:
$P_2O_5$ of 62.4%,
$Al_2O_3$ of 16.8%,
$K_2O$ of 1.8%,
BaO of 2.2%,
ZnO of 7.9%, and
$Fe_2O_3$ of 8.9%.

The thickness of the glass substrate was 0.453 mm.

The first dielectric multilayer film had a repeating structure of a low refractive index layer and a high refractive index layer. The low refractive index layer was formed of silicon oxide ($SiO_2$), and the high refractive index layer was formed of titanium oxide ($TiO_2$). The number of layers was 42 and the entire thickness was 5.1 µm.

The second dielectric multilayer film had a repeating structure of a low refractive index layer and a high refractive index layer. The low refractive index layer was formed of silicon oxide ($SiO_2$), and the high refractive index layer was formed of titanium oxide ($TiO_2$). The number of layers was 6 and the entire thickness was 0.2 µm.

Example 2

In Example 2, the near-infrared cut filter had a configuration in which a first dielectric multilayer film (a reflection film) was disposed on the first surface of the glass substrate and a second dielectric multilayer film (an antireflection film) was disposed on the second surface of the glass substrate.

Glass with the following composition by mol % in terms of oxide (hereinafter referred to as "glass B") was used for the glass substrate:
$P_2O_5$ of 60.6%,
$Al_2O_3$ of 15.8%,
$Li_2O$ of 2.6%,
$Na_2O$ of 2.6%,
$K_2O$ of 1.7%,
MgO of 4.2%,
BaO of 2.1%,
ZnO of 7.4%, and
$Fe_2O_3$ of 3.1%.

The thickness of the glass substrate was 0.453 mm.

The configurations of the first dielectric multilayer film and the second dielectric multilayer film were the same as those of Example 1.

Example 3

In Example 3, the near-infrared cut filter had a configuration in which a first dielectric multilayer film (a reflection film) was disposed on the first surface of the glass substrate. The second dielectric multilayer film was not disposed.

The above-described glass A was used for the glass substrate. The thickness of the glass substrate was 0.453 mm.

The configuration of the first dielectric multilayer film was the same as that of Example 1.

Example 4

In Example 4, the near-infrared cut filter had a configuration in which a first dielectric multilayer film (a reflection film) was disposed on the first surface of the glass substrate. The second dielectric multilayer film was not disposed.

The above-described glass B was used for the glass substrate. The thickness of the glass substrate was 0.453 mm.

The configuration of the first dielectric multilayer film was the same as that of Example 1.

Example 11

In Example 11, the near-infrared cut filter had a structure in which a first dielectric multilayer film (a reflection film) was disposed on the first surface of the glass substrate and a second dielectric multilayer film (an antireflection film) was disposed on the second surface of the glass substrate.

For the glass substrate, a commercial product (D263, by Schott AG) was used (hereinafter referred to as "glass C"). The glass substrate was formed of transparent glass that did not have a function of cutting near-infrared light. The thickness of the glass substrate was 0.57 mm.

The configurations of the first dielectric multilayer film and the second dielectric multilayer film were the same as those of Example 1.

Example 12

In Example 12, the near-infrared cut filter had a configuration in which a first dielectric multilayer film (a reflection film) is disposed on the first surface of the glass substrate and a second dielectric multilayer film (an antireflection film) is disposed on the second surface of the glass substrate.

For the glass substrate, a commercial product (NF-50, by AGC TECHNO GLASS Co., Ltd.) was used (hereinafter referred to as "glass D"). The thickness of the glass substrate was 0.57 mm.

The configurations of the first dielectric multilayer film and the second dielectric multilayer film were the same as those of Example 1.

Example 13

In Example 13, the near-infrared cut filter had a configuration in which on each of both the first surface and the second surface of the glass substrate, the same second dielectric multilayer film (antireflection film) was disposed.

The above-described glass A was used for the glass substrate. The thickness of the glass substrate was 0.453 mm.

The configuration of the second dielectric multilayer film on both surfaces of the glass substrate was the same as that of the second dielectric multilayer film of Example 1.

Example 14

In Example 14, the near-infrared cut filter consisted only of a glass substrate, and the first and second dielectric multilayer films were not disposed.

For the glass substrate, the above-described glass D was used. The thickness of the glass substrate was 0.965 mm.

Figure 7:
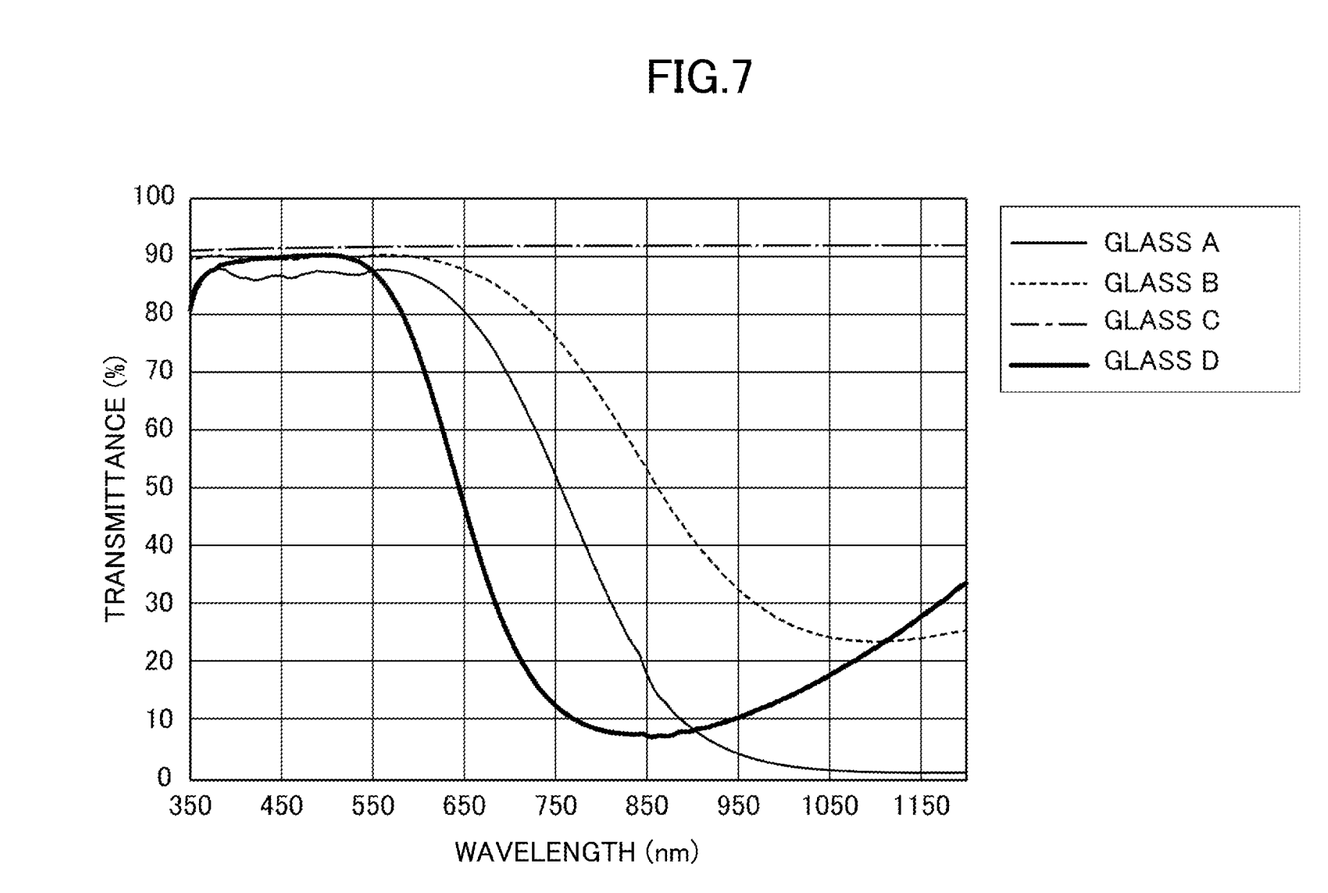
FIG. 7 is a graph showing in a lump transmission characteristics of glass A to glass D used in examples.

FIG. 7 summarizes wavelength-dependences of the transmittances of the glass A to the glass D. A thickness of each glass was the thickness of the glass substrate described in each Example.

Transmittance characteristics of the respective glass were as follows:
Glass A (plate thickness: 0.453 mm): mean transmittance within a wavelength range from 600 nm to 680 nm inclusive was 81.7%, and mean transmittance within a wavelength range from 700 nm to 750 nm inclusive was 61.1%;
Glass B (plate thickness: 0.453 mm): mean transmittance within a wavelength range from 600 nm to 680 nm inclusive was 88.2%, and mean transmittance within a wavelength range from 700 nm to 750 nm inclusive was 80.2%;
Glass C (plate thickness: 0.57 mm): mean transmittance within a wavelength range from 600 nm to 680 nm inclusive was 91.8%, and mean transmittance within a wavelength range from 700 nm to 750 nm inclusive was 91.9%; and
Glass D (plate thickness: 0.57 mm): mean transmittance within a wavelength range from 600 nm to 680 nm inclusive was 52.8%, and mean transmittance within a wavelength range from 700 nm to 750 nm inclusive was 17.9%.

TABLE 1 summarizes the configurations of the near-infrared cut filters according to the examples.

TABLE 1

| | Configuration | | |
|---|---|---|---|
| Example | Transparent substrate | First dielectric multilayer film (reflection film) | Second dielectric multilayer film (antireflection film) |
| 1 | Glass A | Repeating structure of silica layer/titania layer (42 layers, entire thickness was 5.1 μm) | Repeating structure of silica layer/titania layer (6 layers, entire thickness was 0.2 μm) |
| 2 | Glass B | Repeating structure of silica layer/titania layer (42 layers, entire thickness was 5.1 μm) | Repeating structure of silica layer/ titania layer (6 layers, entire thickness was 0.2 μm) |
| 3 | Glass A | Repeating structure of silica layer/titania layer (42 layers, entire thickness was 5.1 μm) | None |
| 4 | Glass B | Repeating structure of silica layer/titania layer (42 layers, entire thickness was 5.1 μm) | None |
| 11 | Glass C | Repeating structure of silica layer/titania layer (42 layers, entire thickness was 5.1 μm) | Repeating structure of silica layer/titania layer (6 layers, entire thickness was 0.2 μm) |
| 12 | Glass D | Repeating structure of silica layer/titania layer (42 layers, entire thickness was 5.1 μm) | Repeating structure of silica layer/titania layer (6 layers, entire thickness was 0.2 μm) |
| 13 | Glass A | None (Second dielectric multilayer film was disposed) | Repeating structure of silica layer/ titania layer (6 layers, entire thickness was 0.2 μm) |
| 14 | Glass D | None | None |

(Results)

FIGS. 8 to 19 show the optical characteristics obtained for the near-infrared cut filter according to Examples 1 to 4, 13, and 14.

Figure 8:
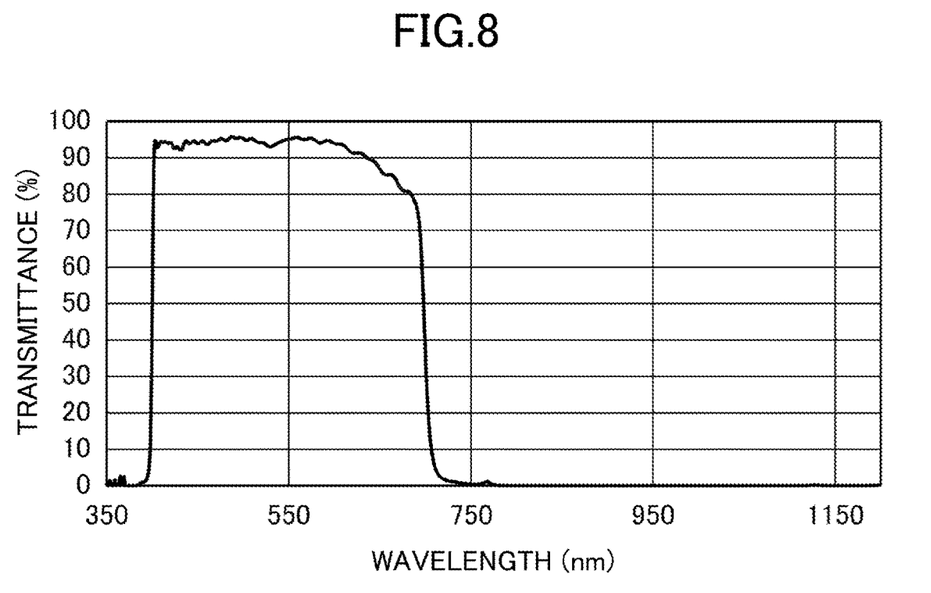
FIG. 8 is a graph showing a wavelength-dependence of a transmittance in a near-infrared cut filter according to Example 1.
Figure 9:
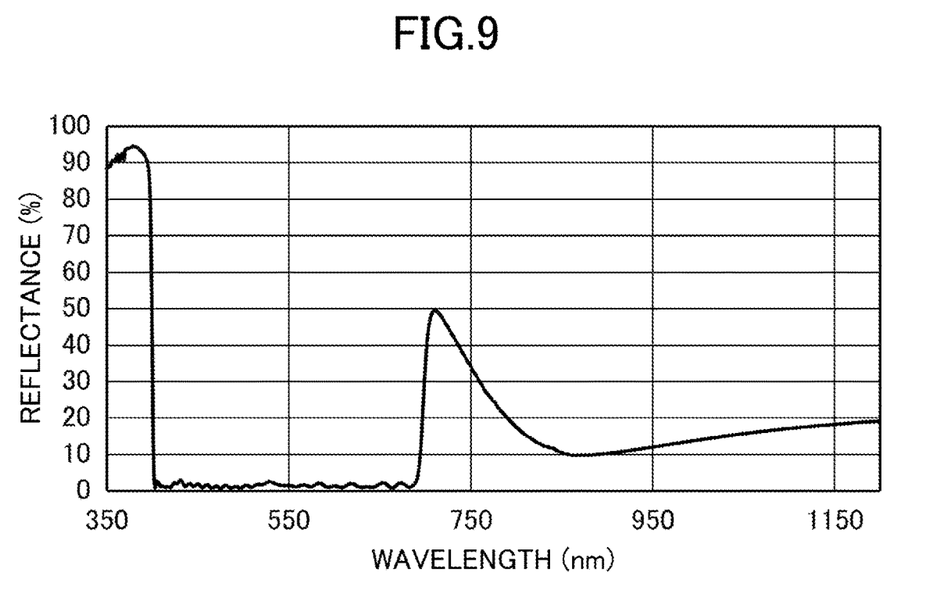
FIG. 9 is a graph showing a wavelength-dependence of a reflectance in the near-infrared cut filter according to Example 1.
Figure 10:
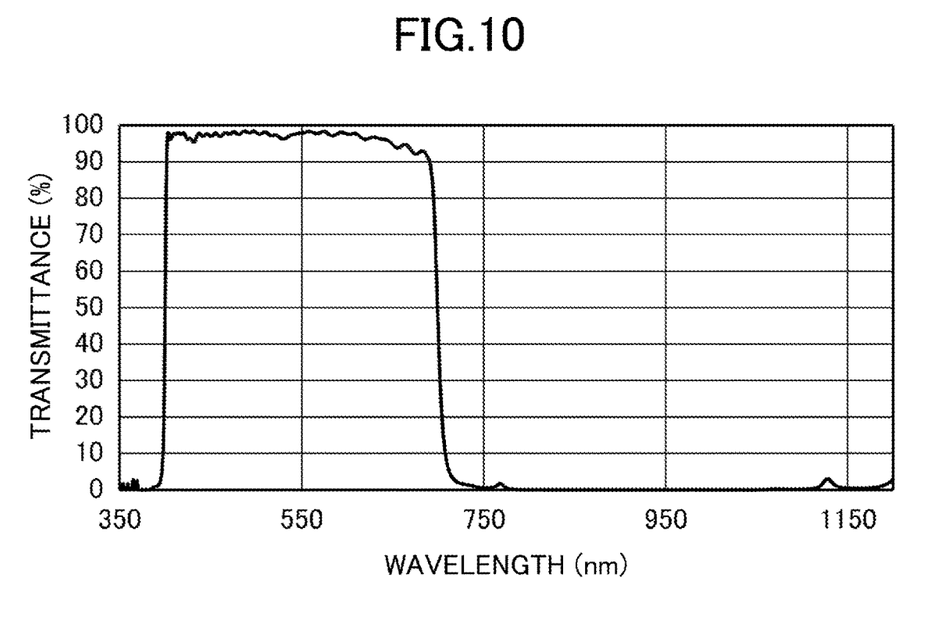
FIG. 10 is a graph showing a wavelength-dependence of a transmittance in a near-infrared cut filter according to Example 2.
Figure 11:
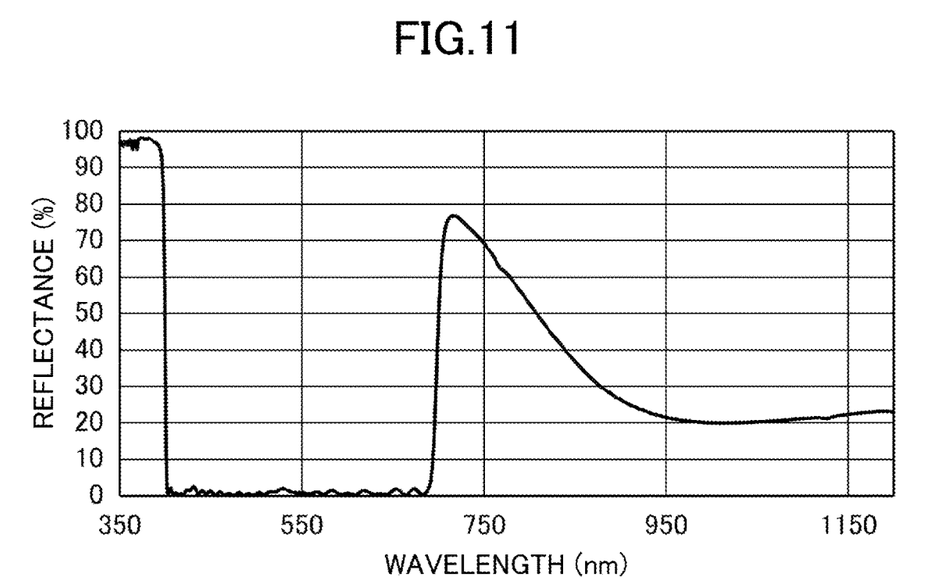
FIG. 11 is a graph showing a wavelength-dependence of a reflectance in the near-infrared cut filter according to Example 2.
Figure 12:
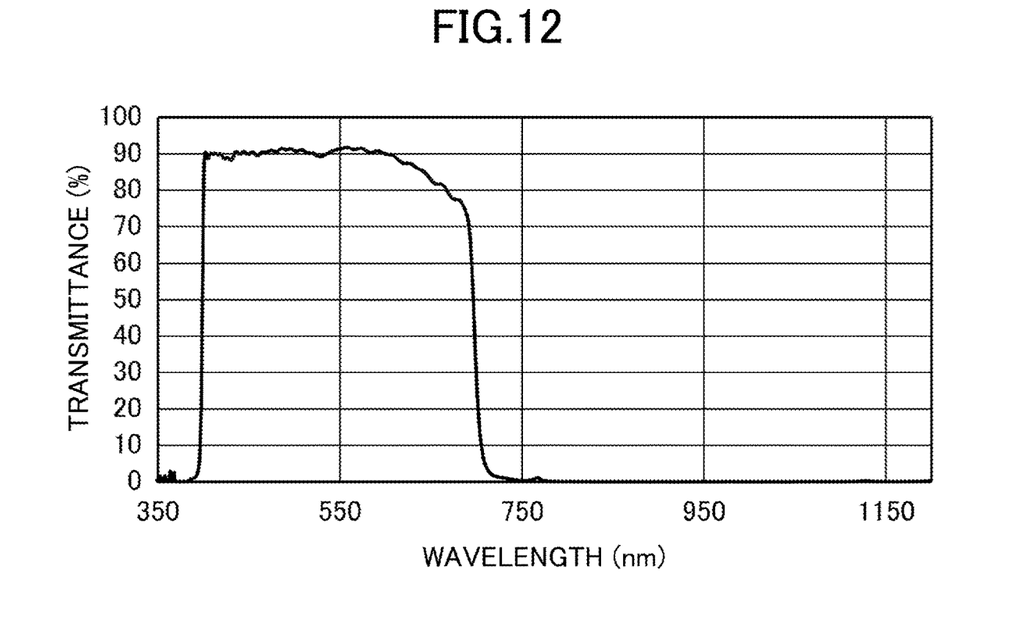
FIG. 12 is a graph showing a wavelength-dependence of a transmittance in a near-infrared cut filter according to Example 3.
Figure 13:
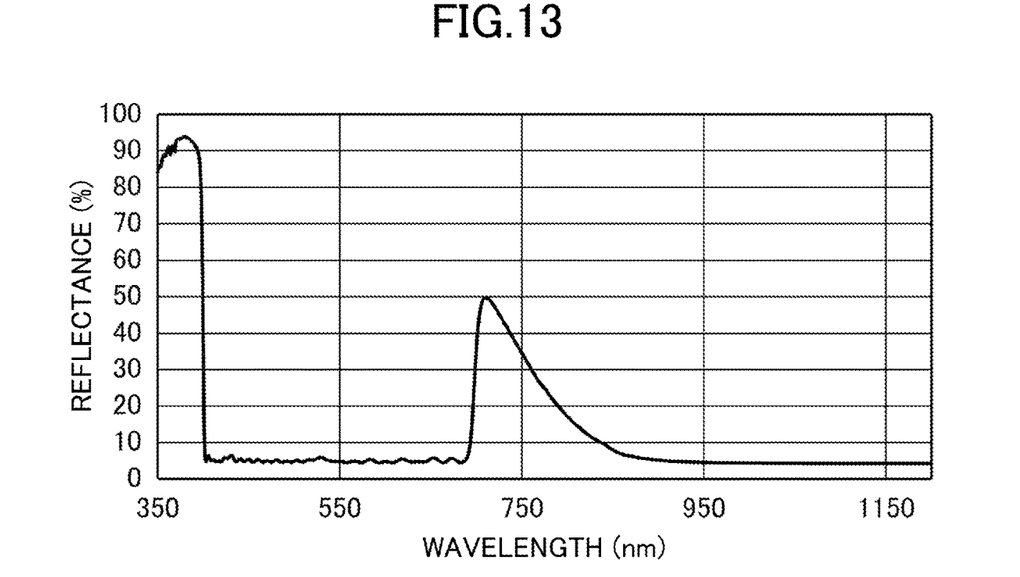
FIG. 13 is a graph showing a wavelength-dependence of a reflectance in the near-infrared cut filter according to Example 3.
Figure 14:
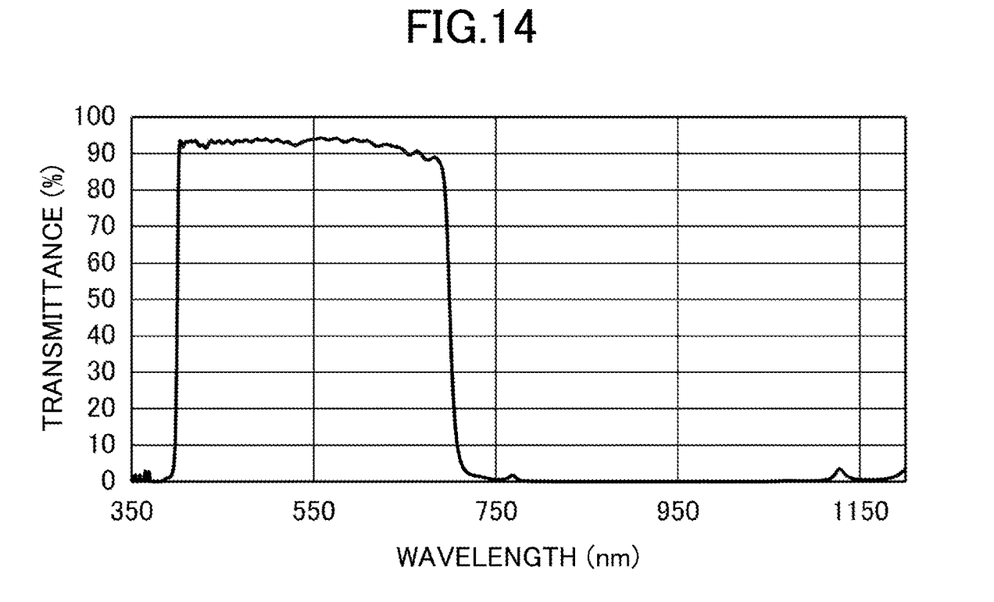
FIG. 14 is a graph showing a wavelength-dependence of a transmittance in a near-infrared cut filter according to Example 4.
Figure 15:
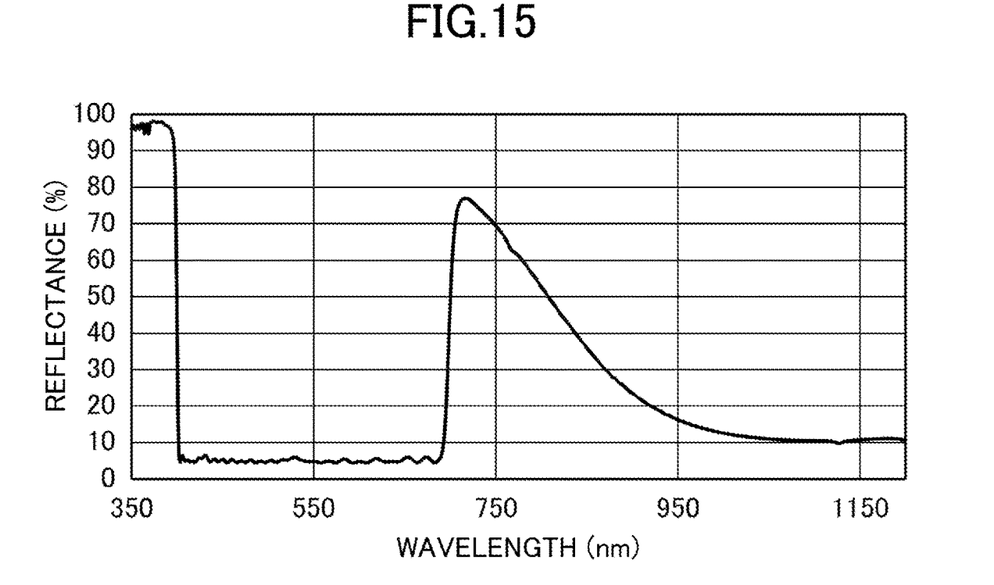
FIG. 15 is a graph showing a wavelength-dependence of a reflectance in the near-infrared cut filter according to Example 4.

FIGS. 8 and 9 show the wavelength-dependences of the transmittance and the reflectance in the near-infrared cut filter according to Example 1, respectively. In addition, FIGS. 10 and 11 show the wavelength-dependences of the transmittance and the reflectance in the near-infrared cut filter according to Example 2, respectively. FIGS. 12 and 13 show the wavelength-dependences of the transmittance and the reflectance in the near-infrared cut filter according to Example 3, respectively. FIGS. 14 and 15 show the wavelength-dependences of the transmittance and the reflectance in the near-infrared cut filter according to Example 4, respectively.

Figure 16:
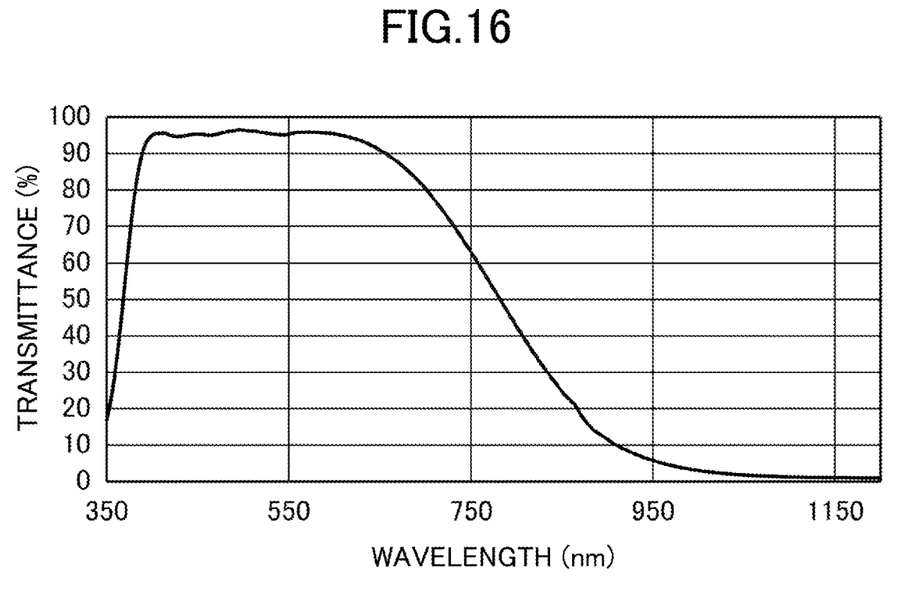
FIG. 16 is a graph showing a wavelength-dependence of a transmittance in a near-infrared cut filter according to comparative example 13.
Figure 17:
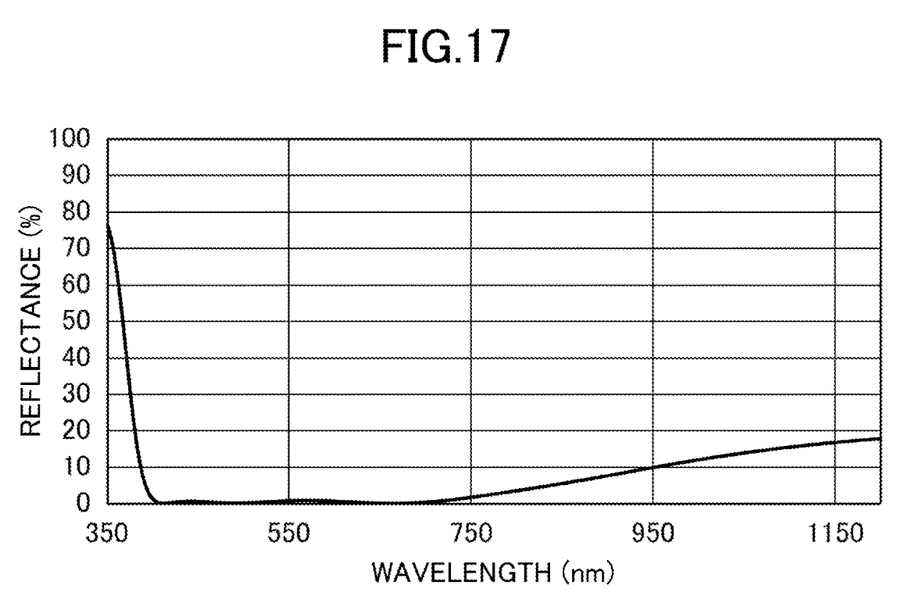
FIG. 17 is a graph showing a wavelength-dependence of a reflectance in the near-infrared cut filter according to comparative example 13.
Figure 18:
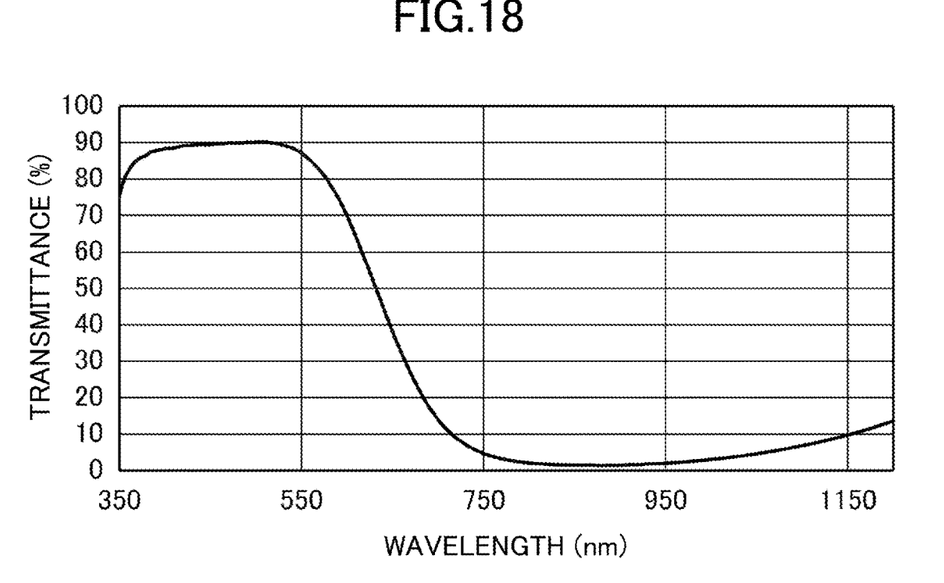
FIG. 18 is a graph showing a wavelength-dependence of a transmittance in a near-infrared cut filter according to comparative example 14.
Figure 19:
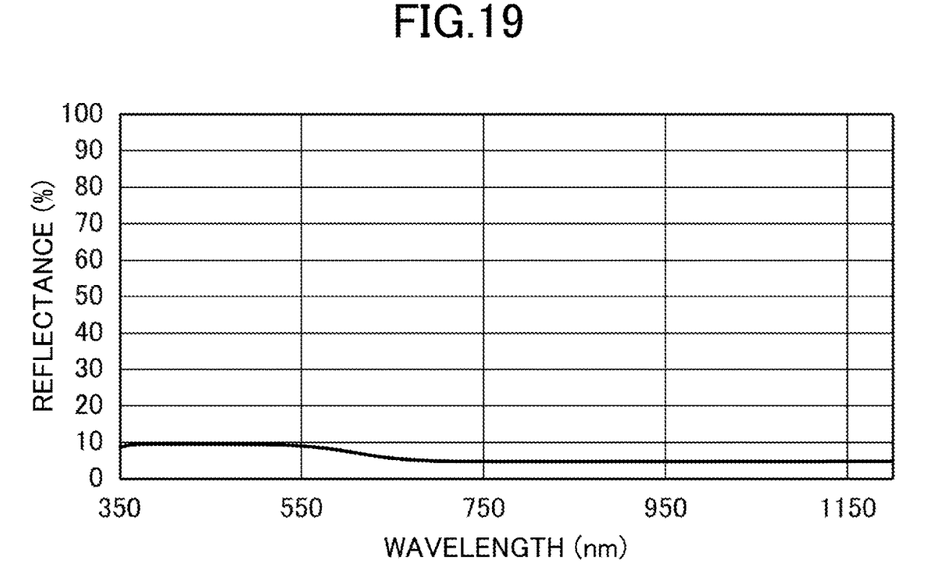
FIG. 19 is a graph showing a wavelength-dependence of a reflectance in the near-infrared cut filter according to comparative example 14.

FIGS. 16 and 17 show the wavelength-dependences of the transmittance and the reflectance in the near-infrared cut filter according to Example 13, respectively. Furthermore, FIGS. 18 and 19 show the wavelength-dependences of the transmittance and the reflectance in the near-infrared cut filter according to Example 14, respectively.

The wavelength-dependences of the transmittance and the reflectance in the near-infrared cut filter according to Example 11 are shown in FIGS. 1 and 2, as above. The wavelength-dependences of the transmittance and the reflectance in the near-infrared cut filter according to Example 12 are shown in FIGS. 3 and 4, as above.

TABLE 2 below summarizes evaluation results obtained by the near-infrared cut filter according to the examples.

TABLE 2

| | Example | | | | | | | |
|---|---|---|---|---|---|---|---|---|
| | 1 | 2 | 3 | 4 | 11 | 12 | 13 | 14 |
| Mean transmittance $T_1$ within range from 700 nm to 750 nm (%) | 4.9 | 6.0 | 4.8 | 5.9 | 6.7 | 1.6 | 65.4 | 5.9 |
| Mean reflectance $R_1$ within range from 700 nm to 750 nm (%) | 42.2 | 72.2 | 43.3 | 72.5 | 94.1 | 4.9 | 1.6 | 4.8 |
| Mean transmittance $T_2$ within range from 600 nm to 680 nm (%) | 88.5 | 95.5 | 84.7 | 91.4 | 99.1 | 57.7 | 89.1 | 37.5 |
| Mean reflectance $R_2$ within range from 900 nm to 1200 nm (%) | 14.6 | 21.5 | 4.4 | 12.9 | 98.4 | 17.6 | 14.5 | 4.8 |
| Mean transmittance $T_3$ within range from 1000 nm to 1200 nm (%) | 0.0 | 0.5 | 0.0 | 0.6 | 2.3 | 0.6 | 1.2 | 9.3 |
| Transmittance $T_4$ at 750 nm (%) | 0.4 | 0.6 | 0.4 | 0.6 | 0.7 | 0.1 | 55.4 | 3.3 |

From these results, the near-infrared cut filter according to Examples 1 to 4 are found to satisfy the following relations:

Mean transmittance $T_1 \leq 20\%$;
Mean reflectance $R_1 \leq 80\%$; and
Mean transmittance $T_2 \geq 65\%$.

Furthermore, the near-infrared cut filter according to Examples 1 to 4 are found to satisfy the following relations:

Mean reflectance $R_2 \leq 30\%$;
Mean transmittance $T_3 \leq 5\%$; and
Transmittance $T_4 \leq 10\%$.

Accordingly, it is expected that the near-infrared cut filter according to Examples 1 to 4 can significantly reduce flaring and ghosting when applied to the imaging apparatus while significantly suppressing the decrease in the amount of visible light, particularly the amount of red light.

As described above, a near-infrared cut filter and an imaging apparatus in accordance with the present disclosure have been described.

However, the present invention is not limited to the above-described embodiment. Various variations, modifications, replacements, additions, deletions, and combinations may be made without departing from the scope recited in claims. They are of course within the technical scope of the present disclosure.

What is claimed is:

1. A near-infrared cut filter, comprising:
 a transparent substrate having a first surface and a second surface opposite to each other; and
 a dielectric multilayer film positioned on a first surface side of the transparent substrate and configured to reflect light within a wavelength range from 700 nm to 750 nm,
 wherein the near-infrared cut filter has a mean transmittance $T_1$ of 20% or less, a mean reflectance $R_1$ of 80% or less, and a mean transmittance $T_2$ of 65% or more, where the mean transmittance $T_1$ is a mean regular transmittance within a wavelength range of 700 nm to 750 nm and is measured when light is incident in a normal direction from a second surface side of the transparent substrate, the mean reflectance $R_1$ is a mean regular reflectance within a wavelength range of 700 nm to 750 nm and is measured when light is incident at an angle of 5° with respect to the normal direction from the second surface side of the transparent substrate, and the mean transmittance $T_2$ is a mean regular transmittance within a wavelength range of 600 nm to 680 nm and is measured when light is incident in the normal direction from the second surface side of the transparent substrate.

2. The near-infrared cut filter according to claim 1, wherein the near-infrared cut filter has a mean transmittance $T_3$ of 5% or less, where the mean transmittance $T_3$ is a mean regular transmittance within a wavelength range of 1000 nm to 1200 nm and is measured when light is incident in the normal direction from the second surface side of the transparent substrate.

3. The near-infrared cut filter according to claim 2, wherein the near-infrared cut filter has a mean regular reflectance $R_2$ of 30% or less, where the mean regular reflectance $R_2$ is a mean regular reflectance within a wavelength range of 900 nm to 1200 nm and is measured when light is incident at an angle of 5° with respect to the normal direction from the second surface side of the transparent substrate.

4. The near-infrared cut filter according to claim 2, wherein the near-infrared cut filter has a transmittance $T_4$ of 10% or less, where the transmittance $T_4$ is a regular transmittance at a wavelength of 750 nm and is measured when light is incident in the normal direction from the second surface side of the transparent substrate.

5. The near-infrared cut filter according to claim 2, wherein the transparent substrate has a mean transmittance of 70% or more within a wavelength range of 600 nm to 680 nm, and a mean transmittance of 90% or less within a wavelength range of 700 nm to 750 nm.

6. The near-infrared cut filter according to claim 2, wherein the glass substrate of the transparent substrate includes $Fe_2O_3$.

7. The near-infrared cut filter according to claim 6, wherein the glass substrate has a composition comprising $P_2O_5$ of from 25% to 75%, $Al_2O_3$ of from 2.5% to 22%, $\Sigma R_2O$, where $\Sigma R_2O$ is a sum of $Li_2O$, $Na_2O$, and $K_2O$, of from 0% to 35%, $\Sigma R'O$, where $\Sigma R'O$ is a sum of $MgO$, $CaO$, $SrO$, $BaO$, and $ZnO$, of from 0.1% to 35%, and $Fe_2O_3$ of from 0.1% to 35%, by mol % in terms of oxide.

8. The near-infrared cut filter according to claim 1, wherein the near-infrared cut filter has a mean regular reflectance $R_2$ of 30% or less, where the mean regular reflectance $R_2$ is a mean regular reflectance within a wavelength range of 900 nm to 1200 nm and is measured when light is incident at an angle of 5° with respect to the normal direction from the second surface side of the transparent substrate.

9. The near-infrared cut filter according to claim 8, wherein the near-infrared cut filter has a transmittance $T_4$ of 10% or less, where the transmittance $T_4$ is a regular transmittance at a wavelength of 750 nm and is measured when light is incident in the normal direction from the second surface side of the transparent substrate.

10. The near-infrared cut filter according to claim 8, wherein the glass substrate of the transparent substrate includes $Fe_2O_3$.

11. The near-infrared cut filter according to claim 1, wherein the near-infrared cut filter has a transmittance $T_4$ of 10% or less, where the transmittance $T_4$ is a regular transmittance at a wavelength of 750 nm and is measured when light is incident in the normal direction from the second surface side of the transparent substrate.

12. The near-infrared cut filter according to claim 1, wherein the transparent substrate has a mean transmittance of 70% or more within a wavelength range of 600 nm to 680 nm, and a mean transmittance of 90% or less within a wavelength range of 700 nm to 750 nm.

13. The near-infrared cut filter according to claim 1, wherein the transparent substrate comprises a glass substrate comprising $P_2O_5$, $Al_2O_3$, R'O, where R'O is at least one selected from the group consisting of MgO, CaO, SrO, BaO, and ZnO, and $Fe_2O_3$, and being substantially free from fluorine.

14. The near-infrared cut filter according to claim 13, wherein the glass substrate has a composition comprising $P_2O_5$ of from 25% to 75%, $Al_2O_3$ of from 2.5% to 22%, $\Sigma R_2O$, where $\Sigma R_2O$ is a sum of $Li_2O$, $Na_2O$, and $K_2O$, of from 0% to 35%, $\Sigma R'O$, where $\Sigma R'O$ is a sum of MgO, CaO, SrO, BaO, and ZnO, of from 0.1% to 35%, and $Fe_2O_3$ of from 0.1% to 35%, by mol % in terms of oxide.

15. The near-infrared cut filter according to claim 13, wherein the glass substrate has a composition comprising $P_2O_5$ of from 25% to 75%, $Al_2O_3$ of from 2.5% to 22%, $\Sigma R_2O$, where $\Sigma R_2O$ is a sum of $Li_2O$, $Na_2O$, and $K_2O$, of from 0% to 35%, $\Sigma R'O$, where $\Sigma R'O$ is a sum of MgO, CaO, SrO, BaO, and ZnO, of from 0.1% to 35%, and $Fe_2O_3$ of from 2.0% to 35%, by mol % in terms of oxide.

16. The near-infrared cut filter according to claim 13, wherein the glass substrate has a composition comprising $P_2O_5$ of from 25% to 75%, $Al_2O_3$ of from 2.5% to 22%, $\Sigma R_2O$, where $\Sigma R_2O$ is a sum of $Li_2O$, $Na_2O$, and $K_2O$, of from 0% to 35%, $\Sigma R'O$, where $\Sigma R'O$ is a sum of MgO, CaO, SrO, BaO, and ZnO, of from 0.1% to 35%, and $Fe_2O_3$ of from 4.0% to 35%, by mol % in terms of oxide.

17. The near-infrared cut filter according to claim 13, wherein the glass substrate has a composition comprising $P_2O_5$ of from 25% to 75%, $Al_2O_3$ of from 2.5% to 22%, $\Sigma R_2O$, where $\Sigma R_2O$ is a sum of $Li_2O$, $Na_2O$, and $K_2O$, of from 0% to 35%, $\Sigma R'O$, where $\Sigma R'O$ is a sum of MgO, CaO, SrO, BaO, and ZnO, of from 0.1% to 35%, and $Fe_2O_3$ of from 5.0% to 35%, by mol % in terms of oxide.

18. An imaging apparatus, comprising:
the near-infrared cut filter of claim 1; and
a solid-state imaging element that generates an electric signal from light incident through the near-infrared cut filter,
wherein the near-infrared cut filter is positioned such that the second surface side of the transparent substrate faces the solid-state imaging element.

19. The near-infrared cut filter according to claim 1, wherein the transparent substrate has a mean transmittance of 75% or more within a wavelength range of 600 nm to 680 nm, and a mean transmittance of 85% or less within a wavelength range of 700 nm to 750 nm.

20. The near-infrared cut filter according to claim 1, wherein the transparent substrate has a mean transmittance of 80% or more within a wavelength range of 600 nm to 680 nm, and a mean transmittance of 80% or less within a wavelength range of 700 nm to 750 nm.

* * * * *